US010119786B1

(12) United States Patent
Furness et al.

(10) Patent No.: US 10,119,786 B1
(45) Date of Patent: Nov. 6, 2018

(54) RADIO SYSTEM HAVING A SLIDING MOUNT FOR A PORTABLE RADIO AND RELATED METHODS

(71) Applicant: Harris Solutions NY, Inc., Rochester, NY (US)

(72) Inventors: Richard H. Furness, Kent, NY (US); Michael W. January, Fayetteville, NC (US); Cory N. Fitzsimmons, Avon, NY (US)

(73) Assignee: HARRIS SOLUTIONS NY, INC., Rochester, NY (US)

( * ) Notice: Subject to any disclaimer, the term of this patent is extended or adjusted under 35 U.S.C. 154(b) by 0 days.

(21) Appl. No.: 15/715,213

(22) Filed: Sep. 26, 2017

(51) Int. Cl.
| H05K 7/00 | (2006.01) |
| H05K 5/00 | (2006.01) |
| F41G 1/387 | (2006.01) |
| F41C 23/16 | (2006.01) |
| F41G 11/00 | (2006.01) |
| F41A 23/08 | (2006.01) |

(52) U.S. Cl.
CPC .............. *F41G 1/387* (2013.01); *F41A 23/08* (2013.01); *F41C 23/16* (2013.01); *F41G 11/003* (2013.01)

(58) Field of Classification Search
CPC ....................................................... H05K 5/00
See application file for complete search history.

(56) References Cited

U.S. PATENT DOCUMENTS

| 5,174,223 | A | * | 12/1992 | Nagy | ..................... | A47B 21/00 |
| | | | | | | 108/50.01 |
| 7,222,451 | B2 | | 5/2007 | Keng et al. | | |
| 8,499,484 | B2 | | 8/2013 | Schneider et al. | | |
| 9,591,255 | B2 | | 3/2017 | Sakiewicz et al. | | |
| 9,598,872 | B2 | | 3/2017 | Zappia | | |
| 9,599,430 | B1 | | 3/2017 | Geissele | | |
| 9,622,529 | B2 | | 4/2017 | Teetzel et al. | | |
| 9,632,187 | B2 | | 4/2017 | Badawi et al. | | |
| 2004/0000083 | A1 | | 1/2004 | Grant, Jr. | | |
| 2009/0154079 | A1 | * | 6/2009 | Bae | ........................ | A47B 21/00 |
| | | | | | | 361/679.02 |
| 2009/0167634 | A1 | * | 7/2009 | Han | ...................... | G06F 1/1601 |
| | | | | | | 345/1.3 |
| 2014/0252187 | A1 | | 9/2014 | Petrovic | | |

OTHER PUBLICATIONS

"Press-Fit Ball-Nose Spring Plungers with Seal," McMaster-Carr Catalog, Jul. 2017; p. 3406.

* cited by examiner

*Primary Examiner* — Jerry Wu
(74) *Attorney, Agent, or Firm* — Allen, Dyer, Doppelt + Gilchrist, P.A.

(57) ABSTRACT

A radio system includes a portable radio and at least one elongate mounting rail having spaced apart indentations therein. At least one sliding mount includes a mount body having a passageway therethrough and slidably receiving a corresponding elongate mounting rail. The mount body is coupled to the portable radio. At least one spring plunger is carried by the mount body and configured to engage at least one adjacent indentation in the elongate mounting rail.

15 Claims, 5 Drawing Sheets

RADIO SYSTEM HAVING A SLIDING MOUNT FOR A PORTABLE RADIO AND RELATED METHODS

FIELD OF THE INVENTION

The present invention relates to the field of radio systems, and more particularly, to a radio system having a portable radio received on a mounting rail and related methods.

BACKGROUND OF THE INVENTION

Portable radios are often used in harsh environments, and in some settings, users mount their radios on vehicles or other locations with radio mounting systems that are cumbersome, prone to vibration, and make adjustment and removal of the portable radios difficult. These portable radios may be larger radios, such as a manpack portable radio, or the smaller handheld portable radios. Although some conventional radio mounting systems for vehicles or other locations may protect the radio from harsh environments and lessen vibration once attached, however, the portable radio may be difficult to move into a desired position for flexibility and allow ready removal. Some portable radio mounting systems are time-consuming and cumbersome to install and require specialized tools or thumbscrews to mount a portable radio onto a vehicle, and in some cases, even on a protective vest worn by the user. These types of radio mounting systems pose technical drawbacks because they do not allow a portable radio to be easily mounted and removed quickly such as on a vehicle subject to vibration or at similar locations where the portable radio may have to be positioned for ready access while also permitting easy removal.

SUMMARY OF THE INVENTION

A radio system comprises a portable radio and at least one elongate mounting rail having a plurality of spaced apart indentations therein. At least one sliding mount comprises a mount body having a passageway therethrough slidably receiving a corresponding elongate mounting rail, and coupled to the portable radio. At least one spring plunger is carried by the mount body and configured to engage at least one adjacent indentation in the elongate mounting rail.

The radio system may further comprise a locking device carried by the mount body. The locking device may comprise a lock body coupled to the mount body at an end thereof, a manual actuating member carried by the lock body, and a locking pin carried by the lock body and moveable between locked and unlocked positions responsive to the manual actuating member. The locking device may further comprise a worm gear arrangement coupling the manual actuating member and the locking pin. The at least one spring plunger may comprise a housing having an end opening and an interior cavity coupled thereto, a ball moveable within the cavity, and a spring biasing the ball to an extended position exposed at the end opening of the housing. The at least one spring plunger may comprise three spring plungers arranged in spaced relation. A vehicle mount may carry the at least one elongate mounting rail. The portable radio may comprise a manpack portable radio or a handheld portable radio.

In yet another example, a sliding mount for an elongate mounting rail has a plurality of spaced apart indentations therein and comprises a mount body having a passageway therethrough slidably receiving the elongate mounting rail, and coupled to the portable radio, and at least one spring ball plunger carried by the mount body and configured to engage at least one adjacent indentation in the elongate mounting rail. The spring ball plunger comprises a housing having an end opening and an interior cavity coupled thereto, a ball moveable within the cavity, and a spring biasing the ball to an extended position exposed at the end opening of the housing.

A locking device may be carried by the mount body. The locking device may comprise a lock body coupled to the mount body at an end thereof, a manual actuating member carried by the lock body, and a locking pin carried by the lock body and moveable between locked and unlocked positions responsive to the manual actuating member. The locking device may further comprise a worm gear arrangement coupling the manual actuating member and the locking pin. The at least one spring ball plunger may comprise three spring ball plungers arranged in spaced relation.

A method of mounting a portable radio to at least one elongate mounting rail having a plurality of spaced apart indentations therein comprises slidably positioning at least one sliding mount along the at least one elongate mounting rail. The at least one sliding mount comprises a mount body having a passageway therethrough slidably receiving the corresponding elongate mounting rail, and coupled to the portable radio, and at least one spring plunger carried by the mount body and configured to engage at least one adjacent indentation in the elongate mounting rail.

DESCRIPTION OF THE DRAWINGS

Other features and advantages will become apparent from the detailed description which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

The radio system permits a portable radio such as a handheld portable radio or a manpack portable radio, for example, such as manufactured by Harris Corporation of Melbourne, Fla., to be coupled to a mount body as part of a sliding mount that receives a corresponding elongate mounting rail. No tools are required to mount or position the portable radio on the elongate mounting rail because it slides and locks in place via an appropriate locking device. The sliding mount may also be configured to fit a mounting rail such as the standard Picatinny rail also known as the MIL-STV-1913 rail and the Standardization Agreement 2324 rail, which of course, may also mount other devices such as flashlights and laser sights.

Figure 1:
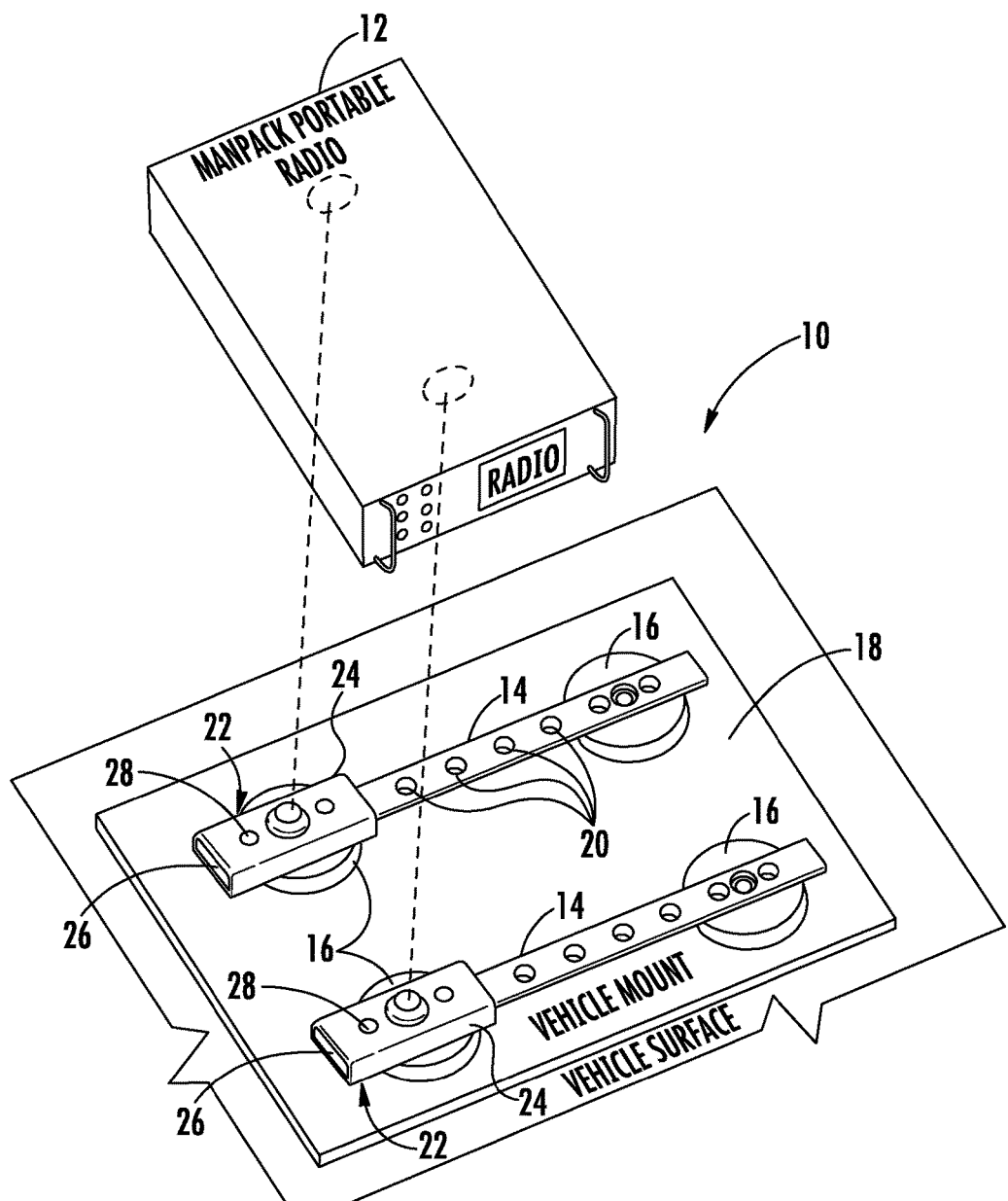
FIG. 1 is an exploded perspective view of the radio system having a portable radio coupled to an elongate mounting rail in accordance with a non-limiting example.
Figure 2:
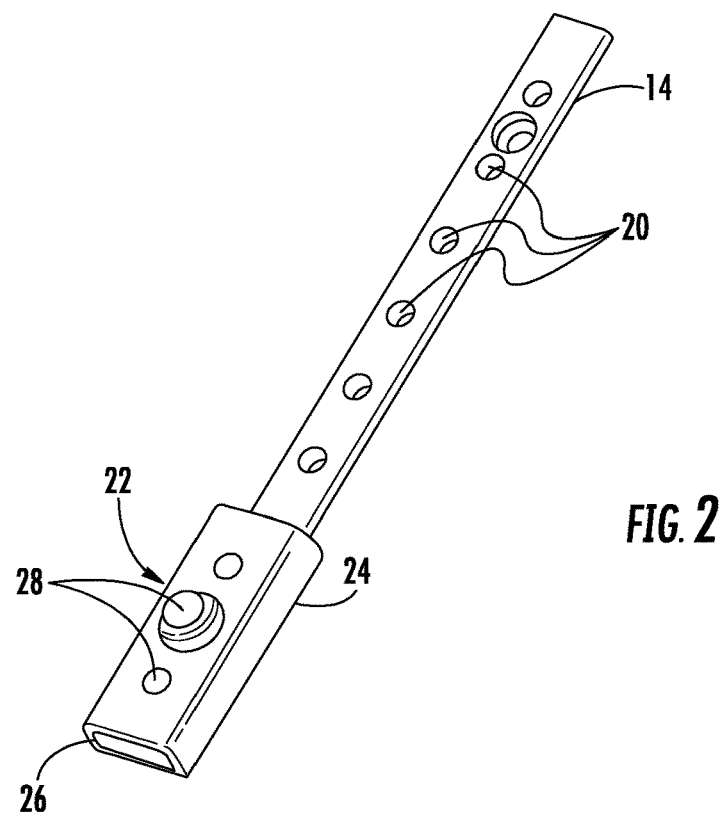
FIG. 2 is a top perspective view of the sliding mount slidably receiving a corresponding elongate mounting rail as shown in FIG. 1.
Figure 3:
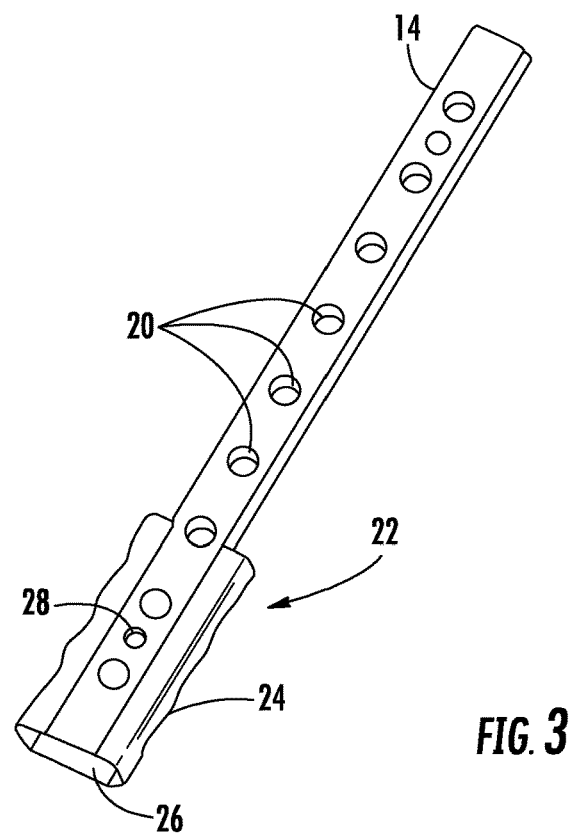
FIG. 3 is a bottom perspective view of the sliding mount receiving the corresponding elongate mounting rail as shown in FIG. 1.
Figure 4:
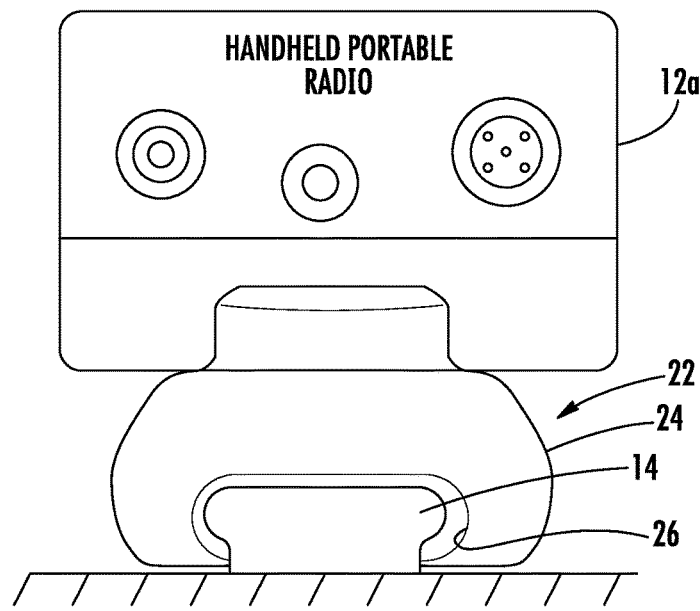
FIG. 4 is an end view of the radio system showing a handheld portable radio connected to the sliding mount in accordance with a non-limiting example.
Figure 5:
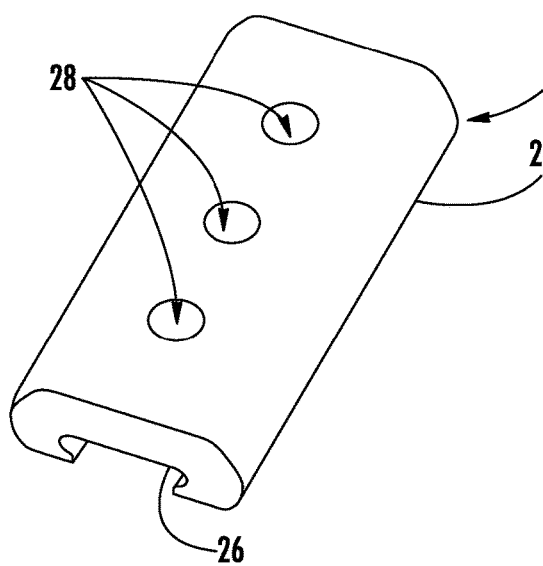
FIG. 5 is a top perspective view of the sliding mount as shown in FIG. 4.
Figure 6:
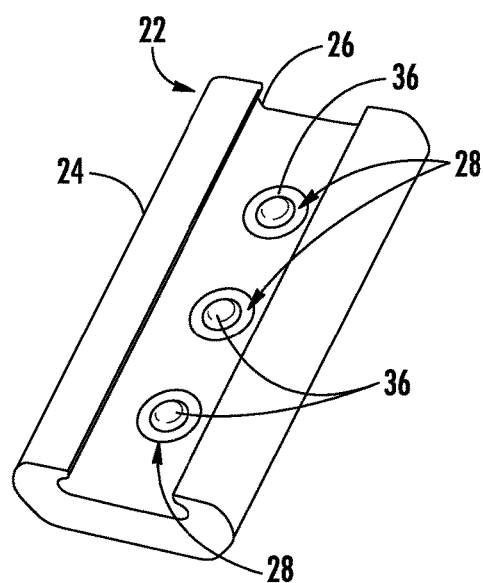
FIG. 6 is a bottom perspective view of the sliding mount as shown in FIG. 4.

Referring now to FIG. 1, there is illustrated the radio system indicated generally at 10 that includes a portable radio 12, which in this example is a manpack portable radio. Two elongate mounting rails 14 are supported via shock absorbers 16 on a vehicle mount 18, which in turn, is mounted on a vehicle surface 20. Each elongate mounting rail 14 includes a plurality of linearly aligned, spaced apart indentations 20, also shown in FIGS. 2 and 3, and in this example are formed as through holes, but could be formed as small recesses and not extend through the elongate mounting rail 14. The portable radio 12 is coupled to a sliding mount indicated generally at 22 and includes a mount body 24 having a passageway 26 therethrough as best shown in FIGS. 5 and 6. The passageway 26 receives the corresponding elongate mounting rail 14 so that each mount body 24 is slidable on the corresponding elongate mounting rail. Referring to FIG. 4, instead of supporting a manpack radio coupled to two mount bodies 24 as shown in FIG. 1, a handheld portable radio 12a in this example is coupled to only one mount body 24 that receives in its passageway 26 an elongate mounting rail 14.

The passageway 26 in the sliding mount 22 is preferably formed in an obround configuration, however, it is possible to form it in other configurations. In the example of FIGS. 5 and 6, the passageway 26 may be formed in a specific dovetail configuration to receive an elongate mounting rail 14 that is configured as a conventional Picatinny style mounting rail, allowing the mount body 24 to slide over the sharper edges of existing Picatinny rails. The mount body 24 and corresponding elongate mounting rail 14 can be formed of many different materials, including plastic or metal. The indentations 20 may be drilled or molded as through holes or recesses depending on the techniques used to manufacture the elongate mounting rail.

Each sliding mount 22 includes at least one spring plunger 28 carried by the mount body 24 and configured to engage at least one adjacent indentation 20 in the elongate mounting rail 14. In the example shown in FIGS. 1-6, each mount body 24 includes three linearly spaced spring plungers 28, which are received in orifices formed in the respective mount body.

Figure 7:
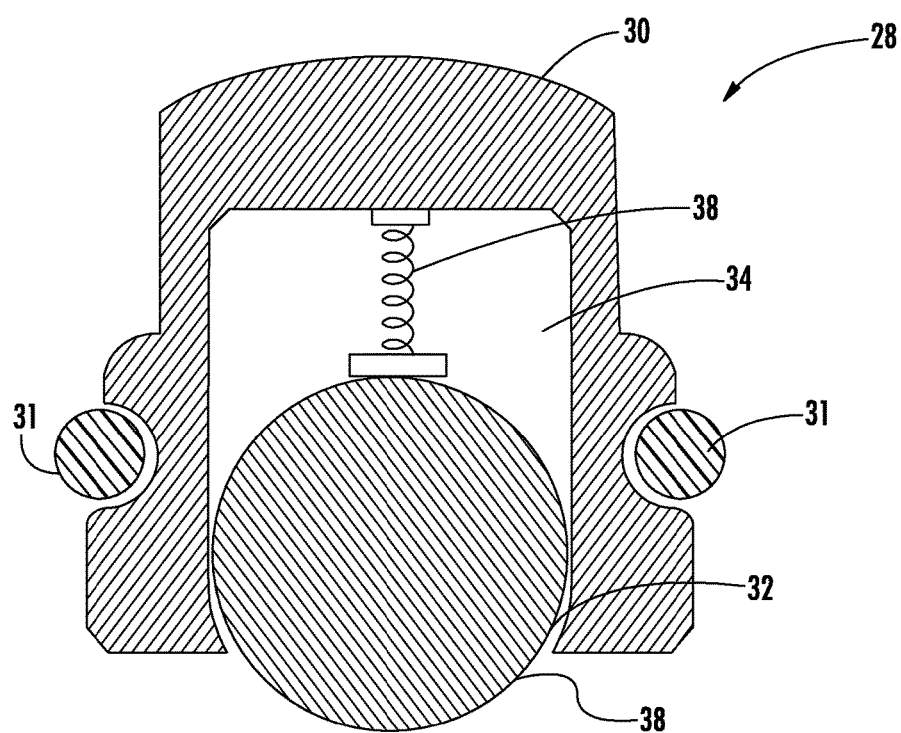
FIG. 7 is a sectional view of a ball spring plunger as shown in FIG. 4.

Referring now to FIG. 7, each spring plunger 28 includes a housing 30 formed preferably of a metallic material and having an opening 32 and an interior cavity 34 coupled thereto. The housing 30 is configured in its outer dimension to fit within an orifice and may include an O-ring 31 to aid in securing the housing within an orifice or be configured as a press fit. A ball 36 formed preferably of a metallic material is movable within the cavity 34 and a spring biases 38 the ball into an extended position exposed at the end opening of the housing 30 as also shown in FIG. 6. Depending on the number of spring plungers 28 carried by a mount body 24, the retaining force generated by the sliding mount 22 on the corresponding elongate mounting rail 14 can vary. For example, when three spring plungers 28 are arranged in spaced linear relation as illustrated, the sliding mount 22 will be retained with a greater amount of force on the corresponding elongate mounting rail 14 and be more secure. This may be advantageous in some environments where vibration or shock are present, such as imparted by a moving vehicle. In that high vibration situation, the sliding mount 22 having the portable radio 12 connected thereto may slide off the corresponding elongate mounting rail 14 if only one spring plunger was employed. If less retaining force is desired, however, then a fewer number of spring plungers 28 could be used.

Figure 9:
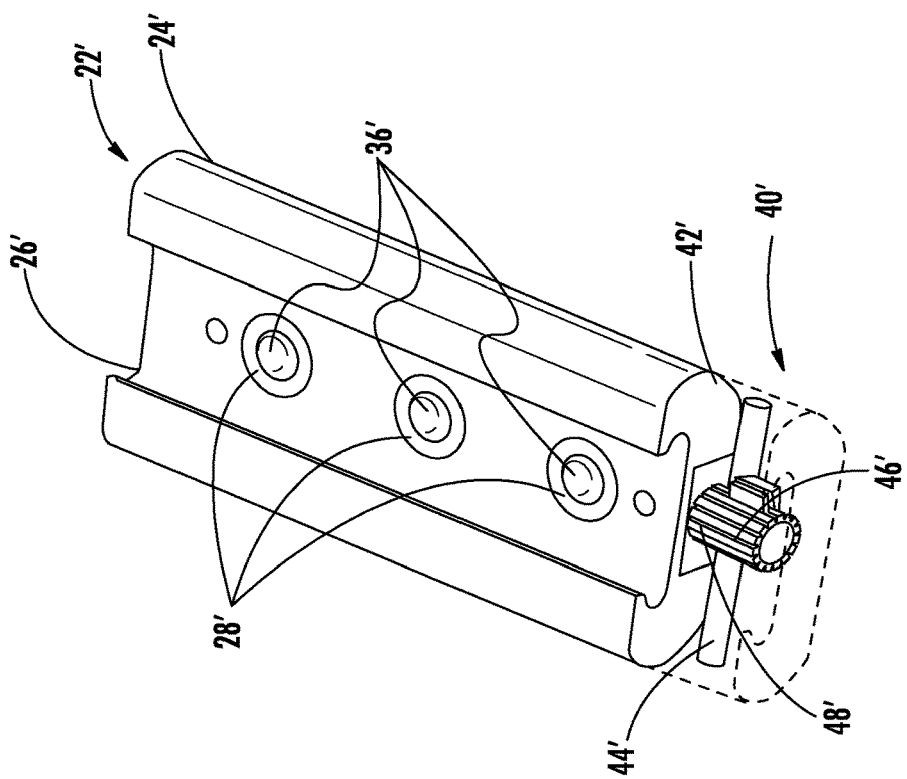
FIG. 9 is a bottom perspective view of the sliding mount as shown in FIG. 8.
Figure 8:
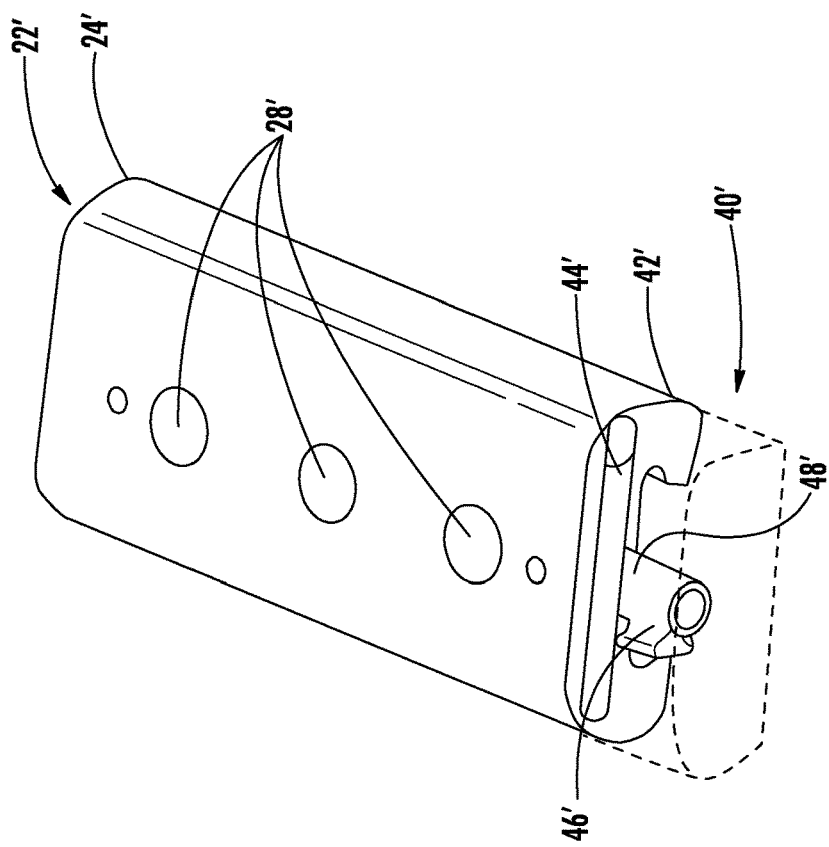
FIG. 8 is a top perspective view of another embodiment of the sliding mount in accordance with a non-limiting example.

Referring now to FIGS. 8 and 9, the mount body may carry a locking device illustrated generally at 40'. The illustrated locking device 40' includes a lock body 42' coupled to the mount body 24' at an end thereof and a manual actuating member 44' carried by the lock body. A locking pin 46' is carried by the lock body 42' and movable between locked and unlocked positions responsive to the manual actuating member 44'. In an example, the locking device 40' includes a worm gear arrangement 48' coupling the manual actuating member 44' and the locking pin 46'. In this example, the manual actuating member 44' is formed as a rod extending traverse through the lock body 42' and includes a toothed surface that engages the worm gear arrangement 48' similar to a rack and pinion arrangement. By pressing the manual activating member 48' and in this example, the rod in one direction, the worm gear arrangement 48' is rotated slightly to move the locking pin 46' into a locked or unlocked position where the locking pin engages an indentation 20' in the mounting rail 14'. Other locking device designs may be used, including quick release pins that engage an indentation 20' or a cam driven mechanism.

Alternative designs for the radio system 10 than those illustrated may be used. For example, the corresponding elongate mounting rail 14 may be shortened to a few inches and include a pivotally mounted attachment leg (not shown) that may be spring biased to permit the shortened elongate mounting rail 14 to be attached to a vest for temporary securement. A handheld portable radio may be mounted onto the sliding mount 22 that receives the shortened elongate mounting rail 14 having about the same length as the sliding mount 22. In this shortened version, the mounting rail 14 may be inserted within a vest pocket and held therein by the pivotally mounted attachment leg to hold the radio in a temporary position so that it may be quickly grasped. The attachment leg may be removable from the elongate mounting rail 14 to allow the mounting rail to be secured on another surface, such as a vehicle mount. In yet another example, it may be possible to attach a drive mechanism (not shown), such as an electric motor, to the side of an elongate mounting rail 14 and drive via an appropriate drive transmission the sliding mount 22 into a preferred position on the elongate mounting rail.

A method of mounting the portable radio 12 to at least one elongate mounting rail 14 having a plurality of spaced apart indentations 20 therein is provided by slidably positioning at least one sliding mount 22 along the at least one elongate mounting rail. The at least one sliding mount 22 includes a mount body 24 having a passageway 26 therethrough slidably receiving the corresponding elongate mounting rail 26 and coupled to the portable radio 12. At least one spring plunger is carried by the mount body 24 and configured to engage at least one adjacent indentation 20 in the corresponding elongate mounting rail 14.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A radio system comprising:
   a portable radio;
   at least one elongate mounting rail having a plurality of spaced apart indentations therein; and
   at least one sliding mount comprising a mount body having a passageway therethrough slidably receiving a corresponding elongate mounting rail, and coupled to said portable radio and having an orifice extending into the passageway; and
   at least one spring ball plunger carried by said mount body and configured to engage at least one adjacent indentation in said corresponding elongate mounting rail;
   wherein said at least one spring ball plunger comprises:
   a housing received within the orifice of the mount body and an O-ring on the housing to aid in securing the housing within the orifice, said housing having an end opening and an interior cavity coupled thereto;
   a ball moveable within the cavity; and
   a spring biasing said ball to an extended position exposed at the end opening of said housing; and
   a locking device carried by said mount body to lock said mount body to said corresponding elongate mounting rail, said locking device comprises:
   a lock body coupled to said mount body at an end thereof;
   a manual actuating member carried by said lock body; and
   a locking pin carried by said lock body and moveable between locked and unlocked positions responsive to said manual actuating member.

2. The radio system according to claim 1 wherein said locking device further comprises a worm gear arrangement coupling said manual actuating member and said locking pin.

3. The radio system according to claim 1 wherein said at least one spring plunger comprises three spring plungers arranged in spaced relation.

4. The radio system according to claim 1 further comprising a vehicle mount carrying said at least one elongate mounting rail.

5. The radio system according to claim 1 wherein said portable radio comprises a manpack portable radio.

6. The radio system according to claim 1 wherein said portable radio comprises a handheld portable radio.

7. A radio system comprising:
   a portable radio;
   at least one elongate mounting rail having a plurality of spaced apart indentations therein; and
   at least one sliding mount comprising a mount body having a passageway therethrough slidably receiving a corresponding elongate mounting rail, and coupled to said portable radio and having an orifice extending into the passageway;
   at least one spring ball plunger carried by said mount body and configured to engage at least one adjacent indentation in said corresponding elongate mounting rail; and
   a locking device carried by said mount body to lock said mount body to said corresponding elongate mounting rail;
   wherein said at least one spring ball plunger comprises:
   a housing received within the orifice of the mount body and an O-ring on the housing to aid in securing the housing within the orifice, said housing having an end opening and an interior cavity coupled thereto;
   a ball moveable within the cavity; and
   a spring biasing said ball to an extended position exposed at the end opening of said housing; and
   said locking device comprises:
   a lock body coupled to said mount body at an end thereof;
   a manual actuating member carried by said lock body; and
   a locking pin carried by said lock body and moveable between locked and unlocked positions responsive to said manual actuating member.

8. The radio system according to claim 7 wherein said locking device further comprises a worm gear arrangement coupling said manual actuating member and said locking pin.

9. The radio system according to claim 7 wherein said at least one spring plunger comprises three spring plungers arranged in spaced relation.

10. The radio system according to claim 7 wherein said portable radio comprises a manpack portable radio.

11. The radio system according to claim 7 wherein said portable radio comprises a handheld portable radio.

12. A sliding mount for an elongate mounting rail having a plurality of spaced apart indentations therein and comprising:
    a mount body having a passageway therethrough slidably receiving the elongate mounting rail, and coupled to said portable radio and having an orifice extending into the passageway; and
    at least one spring ball plunger carried by said mount body and configured to engage at least one adjacent indentation in the elongate mounting rail;
    said spring ball plunger comprising:
    a housing received within the orifice of the mount body and an O-ring on the housing to aid in securing the housing within the orifice, said housing having an end opening and an interior cavity coupled thereto;
    a ball moveable within the cavity; and
    a spring biasing said ball to an extended position exposed at the end opening of said housing; and
    a locking device carried by said mount body to lock said mount body to said corresponding elongate mounting rail;
    said locking device comprises:
    a lock body coupled to said mount body at an end thereof;
    a manual actuating member carried by said lock body; and
    a locking pin carried by said lock body and moveable between locked and unlocked positions responsive to said manual actuating member.

13. The sliding mount according to claim 12 wherein said locking device further comprises a worm gear arrangement coupling said manual actuating member and said locking pin.

14. The sliding mount according to claim 12 wherein said at least one spring ball plunger comprises three spring ball plungers arranged in spaced relation.

15. A method of mounting a portable radio to at least one elongate mounting rail having a plurality of spaced apart indentations therein, the method comprising:
    slidably positioning at least one sliding mount along the at least one elongate mounting rail, the at least one sliding mount comprising:

a mount body having a passageway therethrough slidably receiving the corresponding elongate mounting rail, and coupled to said portable radio; and at least one spring plunger carried by said mount body and configured to engage at least one adjacent indentation in said corresponding elongate mounting rail; and locking the mount body to the corresponding elongate mounting rail using a locking device carried by said mount body;

said locking device comprises:

a lock body coupled to said mount body at an end thereof;

a manual actuating member carried by said lock body; and a locking pin carried by said lock body and moveable between locked and unlocked positions responsive to said manual actuating member;

wherein said at least one spring plunger comprises:

a housing having an end opening and an interior cavity coupled thereto;

a ball moveable within the cavity; and a spring biasing said ball to an extended position exposed at the end opening of said housing.

\* \* \* \* \*